Feb. 25, 1947.  K. L. BUNYARD  2,416,375
AIRCRAFT CONTROL MECHANISM
Filed July 14, 1944  2 Sheets-Sheet 2

INVENTOR
KENNETH L. BUNYARD
BY
HIS ATTORNEYS

Patented Feb. 25, 1947

2,416,375

UNITED STATES PATENT OFFICE 2,416,375

AIRCRAFT CONTROL MECHANISM

Kenneth L. Bunyard, Flushing, N. Y.

Application July 14, 1944, Serial No. 544,884

2 Claims. (Cl. 244—83)

This invention relates to elevator and aileron control mechanism for aircraft. More particularly, the invention relates to the type of aircraft steering mechanism in which a single operating shaft disposed lengthwise of the fuselage is used to transmit the control movements from the pilot's position to the rear part of the fuselage, the ailerons being controlled by a turning movement of this shaft and the elevators by a longitudinal movement thereof.

An object of the invention is to provide an improved mechanism at the pilot's position for imparting the rotational and longitudinal movements to the forward end of such a control shaft, this mechanism being so arranged that it provides not only the necessary positive control, but also can be located in front of the instrument panel leaving the cabin or cockpit unobstructed by control levers and linkage, wires, cables, etc.

The invention aims to provide a control mechanism for aircraft wherein the steering wheel or wheels and their control shafts constitute the only visible parts of the steering mechanism, making it possible to provide a "clean" cabin not unlike that of a motor boat, but the especial object of the invention is to provide an improved control mechanism for actuating the above mentioned operating shaft which is adapted for a two-position or dual control aircraft.

Figure 1:
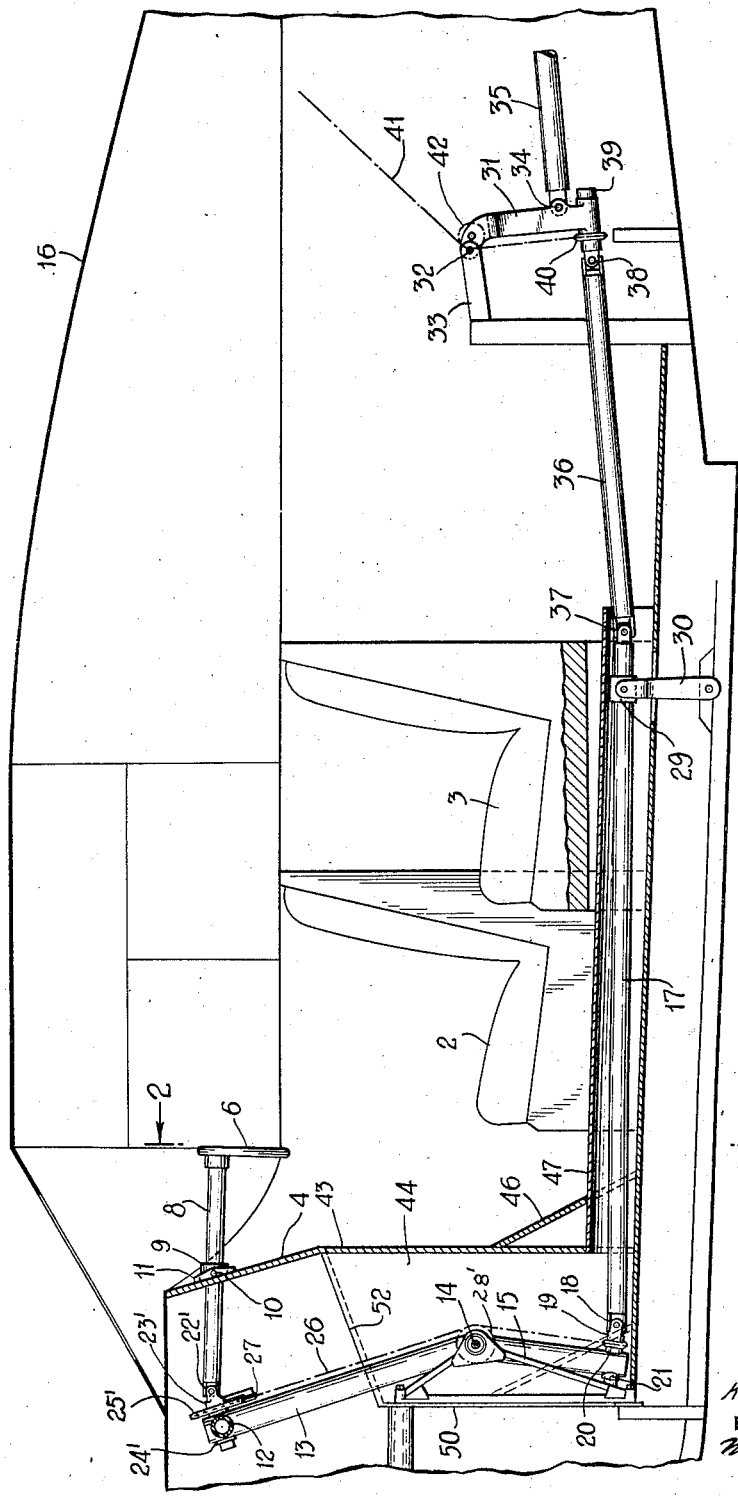
Figure 2:
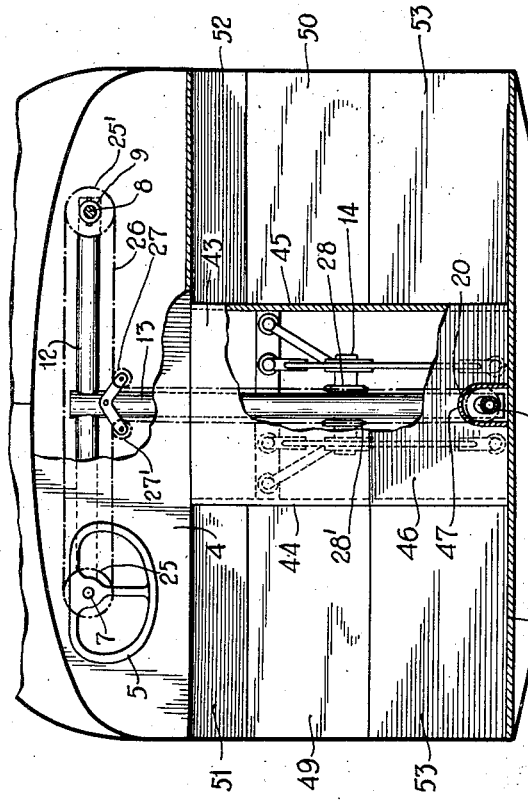
Figure 3:
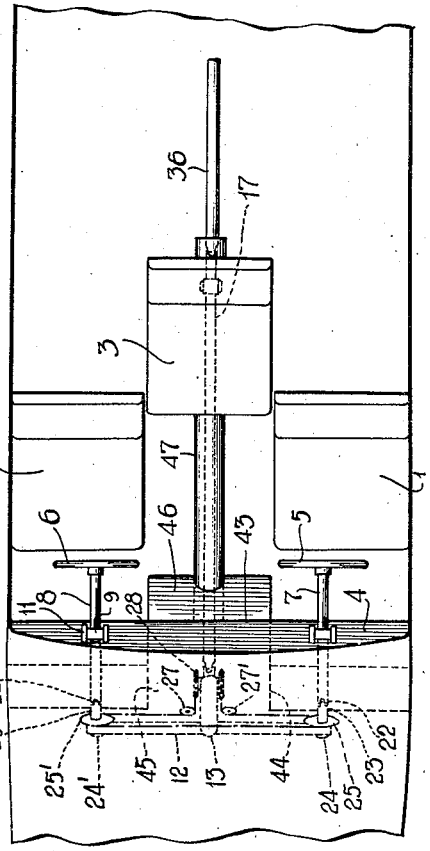

The invention will be understood from a consideration of the accompanying drawings which illustrate by way of example the preferred embodiment thereof. In these drawings, Fig. 1 is a view in central longitudinal section of the mid-portion of a seaplane;

Fig. 2 is a transverse vertical section taken on the line 2—2 of Fig. 1, looking in the direction of the arrows; and Fig. 3 is a plan view of substantially the same portion of the plane as shown in Fig. 1 but drawn to a smaller scale and with the roof of the cabin removed.

The invention will be described in connection with a three-place cabin seaplane having dual control. The three places are indicated by the seats 1, 2 and 3, seats 1 and 2 being the operating or pilot's positions which are arranged abreast of one another crosswise of the aircraft, and the third seat is disposed slightly to the rear of seats 1 and 2 as shown in Fig. 3. The instrument panel is indicated at 4 and the two control wheels 5 and 6 are each fixed upon the rear ends of control shafts 7 and 8 respectively, which pass through the instrument panel 4.

Each of the control shafts 7 and 8 is supported by a guide 9 in the form of a collar having trunnion bearings 10 which provide a horizontal pivot for guide 9 and which are arranged in a support 11 fixed to instrument panel 4. Control shafts 7 and 8 are supported for turning, sliding or rocking movement by their respective guides 9.

The forward ends of control shafts 7 and 8 are connected to the opposite ends of a crossbar 12 at the top of a T-shaped lever 13. This lever is supported on a horizontal pivot shaft 14 (Fig. 1) carried by a bracket 15 fixed to the aircraft structure and supporting the lever so that it can be rocked in a longitudinal central vertical plane with respect to the fuselage 16 of the aricraft.

The lower end of lever 13 is operatively connected to an operating shaft 17 extending lengthwise of the fuselage to the rear end of which the operating connections to the ailerons and elevators (not shown) are made. By operating connections about to be described, carried by the T-shaped lever 13, the rotation of control wheels 5 and 6 is communicated to the ailerons. By fore and aft movement of the control wheels 5 or 6 the T-shaped lever 13 may be rocked about its pivot 14 to impart longitudinal movement to operating shaft 17, and this movement is in turn communicated to the elevators.

The connection with operating shaft 17 at the lower end of lever 13 comprises a universal joint 18 which connects the end of shaft 17 with a short stub shaft 19 on which there is a chain sprocket 20. Stub shaft 19 is rotatably mounted in a bearing support 21 fixed adjacent the lower end of lever 13. T-shaped lever 13 is preferably of tubular construction. In order to provide appropriate clearance both at the bottom and the top of the lever in the present cabin arrangement, its vertical portion as viewed in Fig. 2 is provided with a bend at the pivot 14 (Fig. 1) so that the part below pivot 14 and that above are disposed at an angle to one another and, when the lever is in mid-position, both the lower and upper parts project forwardly of the pivot. However, whether lever 14 is bent or straight will depend on the arrangement of the cabin in which it is to be installed.

The connections between the forward ends of control shafts 7 and 8 and T-shaped lever 13 comprise universal joints 22 and 22' (Fig. 3) which join the ends of shafts 7 and 8 with stub shafts 23 and 23' which are similar to stub shaft 19. Stub shafts 23 and 23' are mounted in a similar manner to stub shaft 19, that is to say, in bearing supports 24 and 24', which are in turn mounted at the opposite ends of the cross-bar 12 at the top of T-shaped lever 13. It will be understood that cross-bar 12 is of tubular construction similar to the upright portion of lever 13.

Stub shafts 23 and 23' carry sprockets 25 and 25' and in order to transmit the rotation of control shafts 7 and 8 to the stub shaft 19 at the lower end of lever 13 and thence to operating shaft 17, an endless chain 26 is trained around sprockets 25 and 25', thence over an idler sprocket 27 (Fig. 2) disposed at the top of lever 13 adjacent cross-bar 12. This endless chain 26 passes downwardly over a second idler sprocket 28 which is arranged to turn freely on pivot shaft 14, thence around sprocket 20 on stub shaft 19 at the lower end of lever 13, thence upwardly over idler sprocket 28' mounted similarly to idler sprocket 28, thence around idler sprocket 27' at the top of lever 13, and thence back to sprocket 25. It will be understood that the portions of chain 26 which are in engagement with idler sprockets 28 and 28' may be made flexible in the direction at right angles to the remainder of the chain in any suitable manner. For example, sections of chain (not shown) may be inserted with their links arranged at right angles to the rest of the chain links.

By means of this transmission chain the rotation of the control wheels 5 and 6 is transmitted to operating shaft 17 in any position of lever 13, and the rocking of lever 13 about its pivot 14 by pushing a control wheel farther away from the operator or pulling it closer to him does not affect the angular position to which shaft 17 may have been turned.

The take-off mechanism for both the rotational and longitudinal movements of shaft 17 is shown in Fig. 1.

Where it is necessary, on account of the construction or layout of the cabin, shaft 17 may be connected to the take-off mechanism through a universal joint 37 and a supplemental shaft 36, as shown in Fig. 1. In this event, shaft 17 may be supported near its rear end in a collar or sleeve 29 mounted at the upper end of a supporting bracket 30 in such a way as to permit shaft 17 to turn freely and also to pivot slightly as it is moved longitudinally through the collar by the rocking movement of lever 13. At the rear of collar 29 a pivoted hanger 31, constituting part of the take-off mechanism, is supported by means of a pivot 32 at its upper end, on a stationary bracket 33.

Hanger 31 has pivoted to it at 34 a link member 35 which is operatively connected with the elevators (not shown) and the actuation of this link is brought about by the longitudinal movement of operating shafts 17 and 36, the latter shaft being connected to the lower end of hanger 31 by means of a universal joint 38 which is arranged between the rear end of shaft 36 and a stub shaft 39. Stub shaft 39 is mounted for rotation in a suitable bearing at the lower end of hanger 31 and is provided with a chain sprocket 40. A chain 41 passes around sprocket 40 and thence upwardly over a pair of idler sprockets 42 which are so mounted on hanger 31 that the pitch circles thereof pass substantially through the center of pivot 32. The two ends of chain 41 are operatively connected with the ailerons. By means of this mechanism the rotation of operating shaft 17, brought about by a turning movement of control wheels 5 and 6, turns the sprocket 40 and hence moves the operating chain 41. The movement of this chain is not affected by the longitudinal swinging of hanger 31.

The control mechanism described provides a very positive control both of the elevators and the ailerons. In addition, the T-shaped lever 13 with the three sprocket members at the ends of its three arms inter-connected by means of an endless chain carried entirely by the lever provides a mechanism for actuating the operating shaft 17 which can readily be concealed in front of the instrument panel 4, by the panel itself and the sub-jacent panels 43, 44 and 45. These three panels partially surround the pivot 14 and approximately the lower two-thirds of lever 13 and are directly in front of the center seat 3. A footboard 46 may be provided at the base of panel 43 for the occupant of the center seat 3. Shaft 17 is concealed by means of a tunnel housing 47 which extends rearwardly from the lower edge of panel 43. Tunnel housing 47 projects upwardly from the floor 48 about the same distance as the housing for the propeller shaft of a motor car.

The legs of the pilot and co-pilot extend forwardly at the sides of panels 44 and 45 and alongside lever 13. The space directly in front of the pilot and co-pilot beneath the instrument panel 4 may be enclosed at the front by vertical panels 49 and 50 and by sloping panels 51 and 52.

The control shafts 7 and 8 are preferably arranged in an approximately horizontal position, and whether or not so arranged the swinging of the upper part of lever 13 about its pivot 14 causes the control wheels 5 and 6 to lift somewhat as they are pushed forward. This is a desirable feature of the present control mechanism inasmuch as it is a natural movement to accompany the operation of the elevators.

While the preferred embodiment of the invention has been described above, it will be understood that changes can be made in the arrangement of the control mechanism without departing from the spirit of the invention, the scope of which is set forth in the appended claims.

I claim:

1. In an aircraft having an operating position, a control mechanism comprising an operating shaft extending longitudinally of the aircraft, said shaft being rotatable to control the movement of certain control elements and axially shiftable to control the movements of another control element, and mechanism for actuating said shaft comprising an upright T-shaped lever pivoted for uni-planar movement in a vertical longitudinal plane and carrying three rotatable members, one disposed at each extremity of said T-shaped lever, a single endless chain carried by said lever for operatively connecting said rotatable members, the said member at the bottom of said lever being operatively connected with said operating shaft, said lever being pivoted forward of the operating position of said aircraft, dual control wheels disposed at said operating position, control shafts for said wheels extending forward from said position and having their forward ends operatively connected respectively to the upper two of said rotatable members, and stationary guides for supporting said shafts.

2. In an aircraft having an operating position, a control mechanism comprising an operating shaft extending longitudinally of the aircraft, said shaft being rotatable to control the movements of certain control elements and axially shiftable to control the movements of another control element, and mechanism for actuating said shaft comprising an upright T-shaped lever pivoted for uni-planar movement in a vertical longitudinal plane and carrying three rotatable members, one disposed at each extremity of said T-shaped lever, a single endless chain carried by said lever for operatively connecting said rotatable members, the said member at the bottom of said lever being operatively connected with said operating shaft, an upwardly extending panel disposed between said lever and said operating position for concealing said control mechanism, dual control shafts each having a control wheel at its rear end, and a pair of guiding apertures in said panel substantially at the level of the top of said lever, said control shafts extending through said apertures and being operatively connected at their forward ends respectively with said rotatable members at the top of said lever.

KENNETH L. BUNYARD.

REFERENCES CITED

The following references are of record in the file of this patent:

UNITED STATES PATENTS

| Number | Name | Date |
| --- | --- | --- |
| 2,108,861 | Kenyon | Feb. 22, 1938 |
| 1,916,444 | Sikorsky | July 4, 1933 |
| 1,813,485 | Cook | July 7, 1931 |
| 1,375,199 | Zimmermann | Apr. 19, 1921 |
| 2,046,570 | Malinowski | July 7, 1936 |
| 1,720,661 | Brimm, Jr. | July 16, 1929 |
| 1,820,906 | Bowers | Sept. 1, 1931 |
| 1,900,068 | Mueller | Mar. 7, 1933 |
| 2,339,955 | Shelter | Jan. 25, 1944 |